US008707243B2

(12) United States Patent
Stowers et al.

(10) Patent No.: US 8,707,243 B2
(45) Date of Patent: Apr. 22, 2014

(54) INTERFACE CONFIGURATION SYSTEM AND METHOD

(75) Inventors: Jeffery P. Stowers, Mount Sidney, VA (US); Jamie L. Shand, Waynesboro, VA (US); Eric M. Husted, Charlottesville, VA (US); Christopher J. Church, Waynesboro, VA (US); Brian A. Linger, Verona, VA (US); Gabriel G. Roffman, Charlottesville, VA (US)

(73) Assignee: Virginia Panel Corporation, Waynesboro, VA (US)

( * ) Notice: Subject to any disclaimer, the term of this patent is extended or adjusted under 35 U.S.C. 154(b) by 210 days.

(21) Appl. No.: 12/849,781

(22) Filed: Aug. 3, 2010

(65) Prior Publication Data

US 2011/0055787 A1 Mar. 3, 2011

Related U.S. Application Data

(60) Provisional application No. 61/230,973, filed on Aug. 3, 2009.

(51) Int. Cl.
*G06F 11/22* (2006.01)
*G06F 17/50* (2006.01)

(52) U.S. Cl.
USPC ............... 716/136; 716/126; 700/95; 700/96; 700/97; 700/107; 709/203; 705/27.1; 705/27.2; 705/28; 705/29

(58) Field of Classification Search
USPC .............. 716/136, 126; 700/95–97, 104–107; 709/203; 705/27.1, 27.2, 28, 29
See application file for complete search history.

(56) References Cited

U.S. PATENT DOCUMENTS

| 5,867,382 | A   | * | 2/1999  | McLaughlin ................... 700/17 |
|-----------|-----|---|---------|---------------------------------------|
| 6,629,008 | B2  | * | 9/2003  | Shiiba et al. .................. 700/100 |
| 6,678,877 | B1  | * | 1/2004  | Perry et al. .................... 361/720 |
| 6,877,033 | B1  | * | 4/2005  | Garrett et al. ................. 709/218 |
| 7,017,138 | B2  | * | 3/2006  | Zirojevic et al. .............. 716/128 |
| 7,188,333 | B1  | * | 3/2007  | LaMotta et al. .............. 717/106 |
| 7,240,319 | B2  | * | 7/2007  | Bentley et al. ............... 716/102 |
| 7,458,055 | B2  | * | 11/2008 | Bentley et al. ............... 716/137 |
| 7,613,729 | B2  | * | 11/2009 | Nuno et al. ........................... 1/1 |

(Continued)

OTHER PUBLICATIONS

"Excel 2003—Tutorial 1" @Jan. 18, 2006.*

(Continued)

*Primary Examiner* — Nha Nguyen
(74) *Attorney, Agent, or Firm* — 24IP Law Group; Timothy R DeWitt

(57) ABSTRACT

A computer-implemented method for designing an electrical interconnect device. The method comprises the steps of entering an instrument ID into a computer through an input device, entering a slot number corresponding to the instrument ID into the computer through the input device, entering an interface component identifier into the computer through the input device, associating the interface component identifier with the instrument ID and the slot number in a database in the computer, generating and displaying on a computer display a preview of a configuration of an electrical interconnect device, wherein the preview comprises a table showing the instrument ID, the slot number, the interface component identifier and an association between the interface component ID and the instrument ID, and wherein the interface component ID shown in the preview comprises a link to data associated with the interface component, and displaying in a separate window on the computer display the data associated with the interface component.

13 Claims, 8 Drawing Sheets

(56) References Cited

U.S. PATENT DOCUMENTS

| | | | | |
|---|---|---|---|---|
| 7,738,985 | B2* | 6/2010 | Awata | 700/103 |
| 2004/0034497 | A1* | 2/2004 | Shah et al. | 702/127 |
| 2004/0205514 | A1* | 10/2004 | Sommerer et al. | 715/501.1 |
| 2005/0114228 | A1* | 5/2005 | Wadhwani | 705/26 |
| 2007/0033572 | A1* | 2/2007 | Donovan et al. | 717/106 |
| 2007/0288445 | A1* | 12/2007 | Kraftsow | 707/4 |
| 2010/0058188 | A1* | 3/2010 | Shah et al. | 715/734 |
| 2010/0064763 | A1* | 3/2010 | Gaikwad et al. | 73/1.01 |

OTHER PUBLICATIONS

"ATML—The Standard for Interfacing Test System Components Using XML," National Instruments (2006).

"Draft Trial-Use Standard for Automatic Test Markup Language (ATML) for Exchanging Automatic Test Equipment and Test Information via XML," IEEE P1671/D2 (Dec. 2005).

"AML (Automatic Test Markup Language)," The Test Savvy Engineer, (Oct. 1, 2007).

* cited by examiner

FIG. 3

INTERFACE CONFIGURATION SYSTEM AND METHOD

CROSS-REFERENCE TO RELATED APPLICATIONS

The present application claims the benefit of the filing date of U.S. Provisional Patent Application Ser. No. 61/230,973 filed by the present inventors on Aug. 3, 2009.

The aforementioned provisional patent application is hereby incorporated by reference in its entirety.

STATEMENT REGARDING FEDERALLY SPONSORED RESEARCH OR DEVELOPMENT

None.

BACKGROUND OF THE INVENTION

1. Field of the Invention

The present invention relates to a systems and methods for configuring interface systems for automatic test equipment.

2. Brief Description of the Related Art

Interface systems for automatic test equipment are typically composed of many different items potentially from many different manufacturers integrated together into a system. A typical interface system would have one or more card chassis, receivers, test adapters (also known as "ITA's"), instrument connections, terminal block cables, modules, patchcords and pins. The system also could include various external instruments.

In the past, the various component parts or pieces of an interface system commonly were selected and perhaps assembled by a service provider sometimes referred to as an "integrator." The integrator would perform research to ensure that selected component parts of an interface system were compatible.

In recent years, a new XML-based standard for automatic test equipment, referred to as "Automatic Test Markup Language" or "ATML," has emerged in the test and measurement industry. See, "ATML—The Standard for Interfacing Test System Components Using XML," National Instruments (2006); "Draft Trial-Use Standard for Automatic Test Markup Language (ATML) for Exchanging Automatic Test Equipment and Test Information via XML," IEEE P1671/D2 (December, 2005); and "AML (Automatic Test Markup Language)," The Test Savvy Engineer, (Oct. 1, 2007). ATML is a cooperative effort to define a collection of XML schemes to represent test information such as test programs, test asset interoperability, and unit under test ("UUT") test data.

SUMMARY OF THE INVENTION

In a preferred embodiment, the present invention is a computer-implemented method for designing an electrical interconnect device. The method comprises the steps of entering an instrument ID into a computer through an input device, entering a slot number corresponding to the instrument ID into the computer through the input device, entering an interface component identifier into the computer through the input device, associating the interface component identifier with the instrument ID and the slot number in a database in the computer, generating and displaying on a computer display a preview of a configuration of an electrical interconnect device, wherein the preview comprises a table showing the instrument ID, the slot number, the interface component identifier and an association between the interface component ID and the instrument ID, and wherein the interface component ID shown in the preview comprises a link to data associated with the interface component; and displaying in a separate window on the computer display the data associated with the interface component. In various embodiments, the displayed data associated with the interface component may be retrieved from a database in a storage or from a website or server of, for example, a manufacturer or distributor of the interface component.

The method may further comprise steps of generating, displaying on the computer, and/or printing a price quotation for the configuration. Still further, the method may have means, such as the generation and sending of an electronic mail message, to provide the generated price quotation for the configuration to a customer.

In another embodiment, the present invention is a computer-implemented method for designing an electrical interconnect device. The method comprises the steps of displaying on a display connected to a computer a request form requesting a plurality of instrument ID's from a user, providing a plurality of instrument ID's entered on the request form to a server, generating on the server a configuration database corresponding to the plurality of instrument ID's entered on the request form, associating a slot number with each of the plurality of instrument ID's in the configuration database, populating the configuration database in the server with a plurality of component identifiers, associating each of the plurality of component identifier with one of the instrument ID's and a slot number in the configuration database and generating and displaying on a computer display a preview of a configuration based upon data in the configuration database. The method may further comprise the step of providing on the preview a link to data associated with a displayed instrument ID. Still further, the method may comprise the step of displaying as an overlay on the preview the data associated with a displayed instrument ID.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which:

FIG. 3 is a diagram of a blank user interface of an interface system configurator in accordance with a preferred embodiment of the present invention.

DETAILED DESCRIPTION OF THE PREFERRED EMBODIMENTS

The interface configuration system of the present invention provides for a web-based approach to interface configuration and design in which a configuration request can be configured and displayed in a user-friendly layout for the customer. A preferred embodiment of the present invention provides for a request to be submitted via an on-line form and then configuring a system meeting the request and providing a display showing horizontal and vertical relationships between various components in the configuration. The present invention provides many benefits, including but not limited to, allowing organization of part numbers to assemble and communicate a desired configuration, keyword hinting to assist in developing a configuration request, displaying a product information window to show additional information about a product or component and linking a configuration to other configurations or other software.

Figure 1:
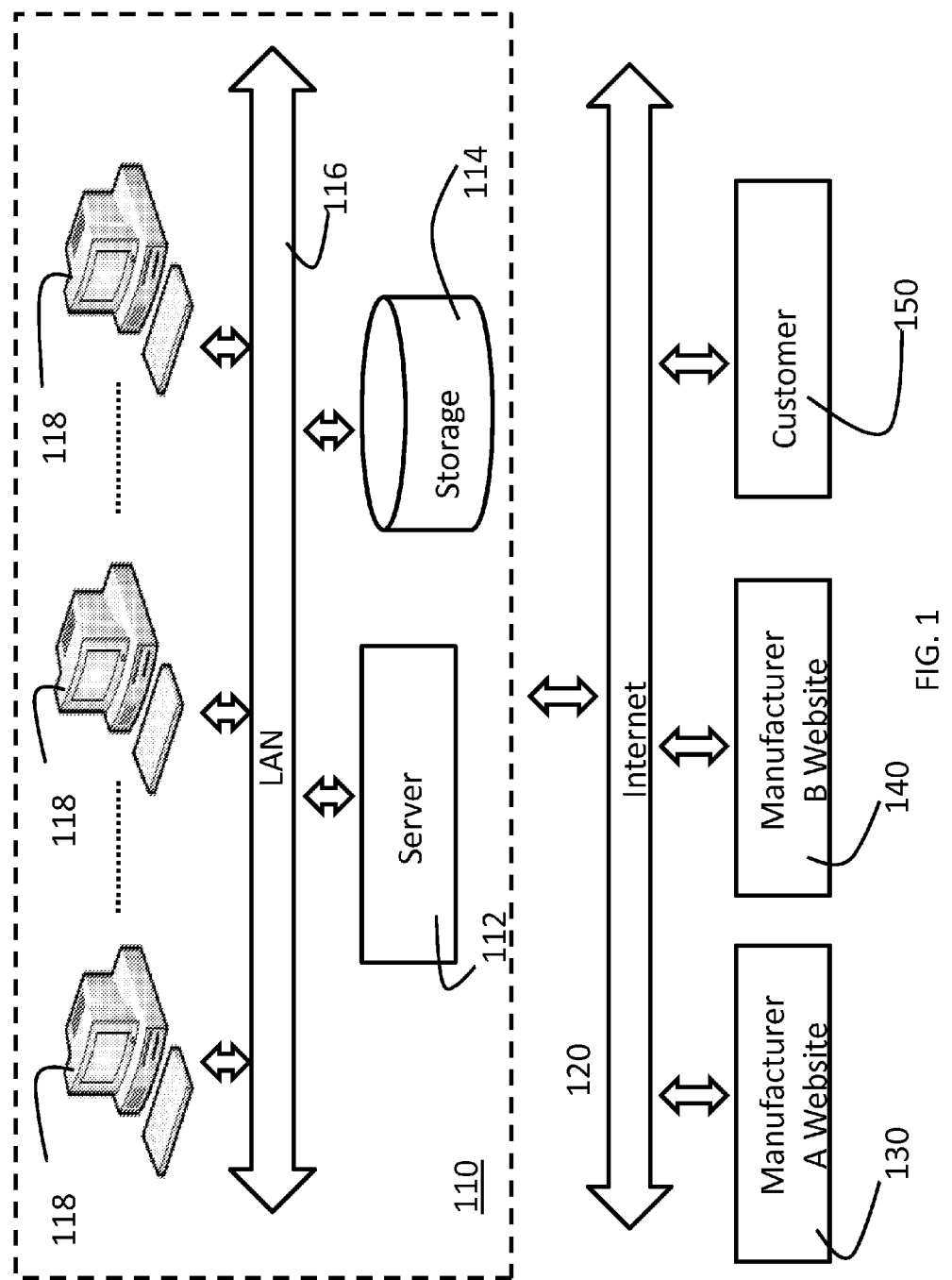
FIG. 1 is a block diagram of an exemplary system of a preferred embodiment of the present invention.

A preferred embodiment of the present invention will be discussed with reference to FIGS. 1-6. FIG. 1 shows the system architecture in which a preferred embodiment of the present invention may be used. The system and method of the present invention may be run on a local system 110 that may, for example, have a server 112, a storage 114, a local area network 116, and one or many terminals or PC's 118, each of which may be used to access the computer-implemented configurator of the present invention. The local system 112 preferably has access to websites of various other manufacturers 130, 140 and customers 150, for example, through the internet 120. The server 112 and/or the one or many terminals or PC's 118 may access the internet and thereby retrieve data. Additionally, the server 112 and the one or many terminals or PC's may access data, such as in a database, stored in storage 114 or in a memory.

The system and method of the present invention may be implemented in many different ways and may use various levels of security. For example, system configurations may be designed using the present system and method by an individual that may be referred to as "Configuration Administrator," who may have the right to design and amend a particular configuration and perhaps be given the ability to authorize others, such as customers, to amend a particular configuration.

Figure 2:
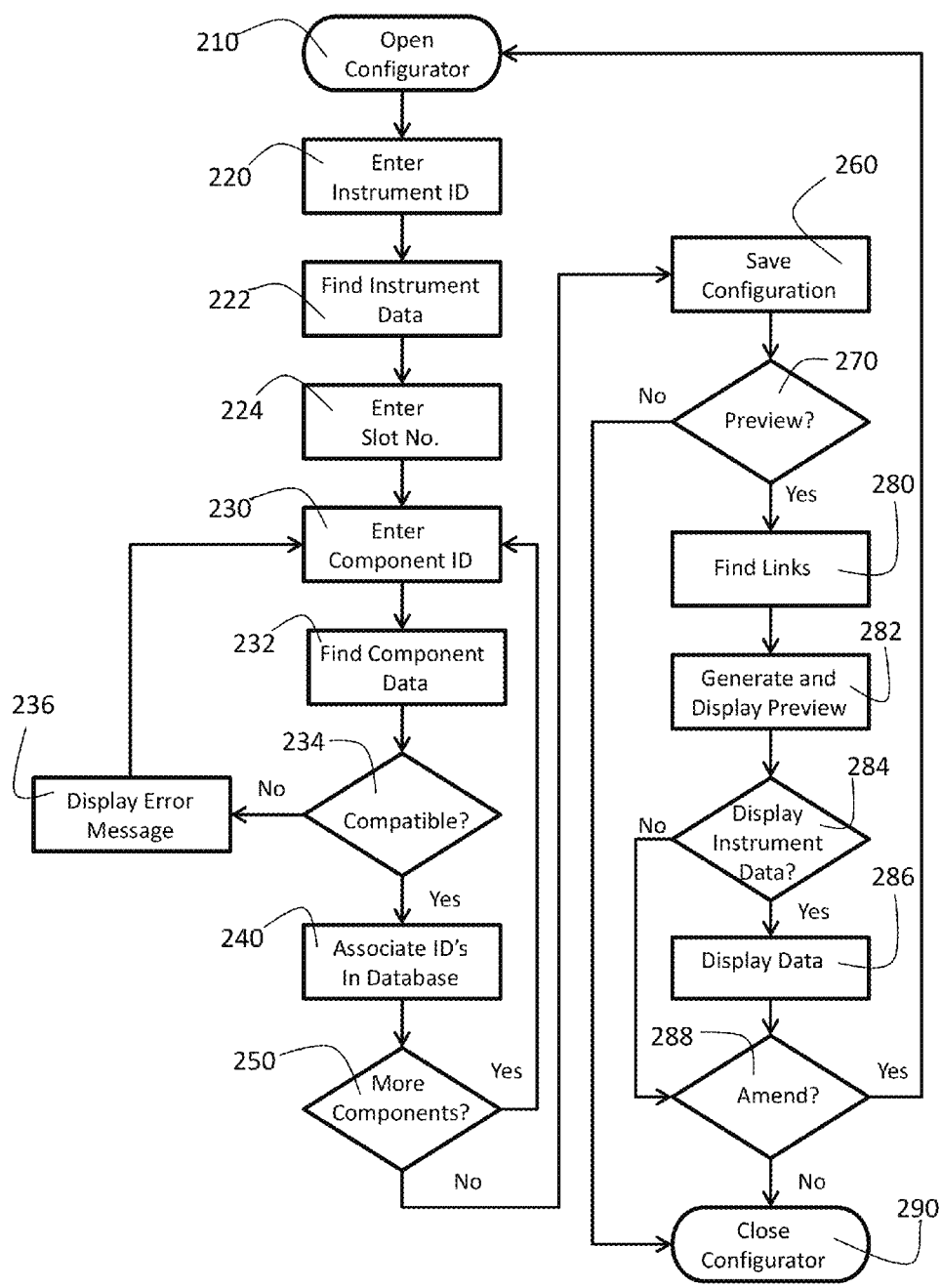
FIG. 2 is a flow chart of the method of an interface system configurator in accordance with a preferred embodiment of the present invention.
Figure 3:
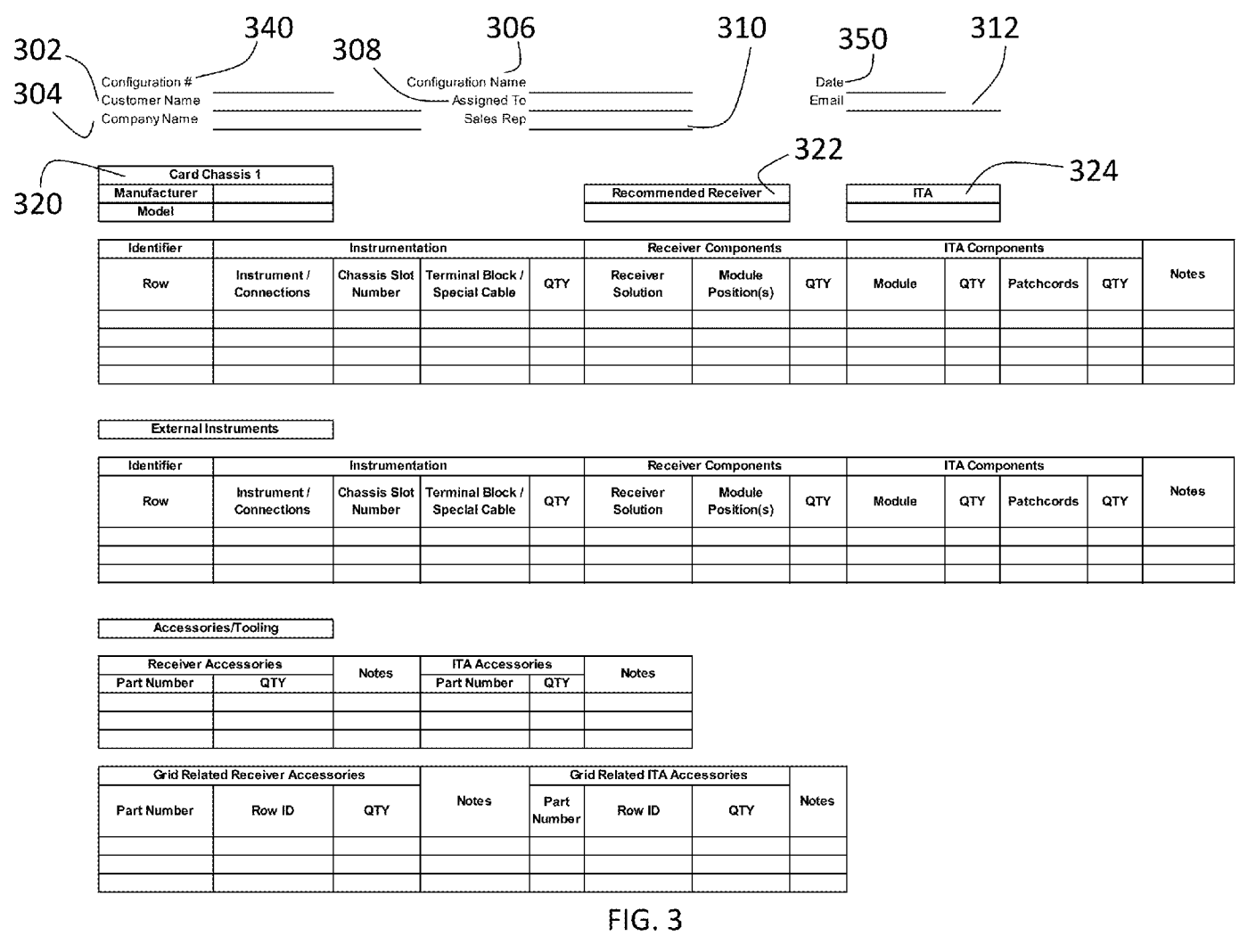

A method of a preferred embodiment of the present invention will be described with reference to FIG. 2. Beginning at step 210, the configurator is opened on a terminal or PC 118. The user interface of a preferred embodiment is shown in FIG. 3. In the example shown in FIG. 3, the user interface includes locations for the configuration administrator to enter identifying information such as a customer name 302, company name 304, configuration name 306, an engineer or other assignee 308, a sales rep 310, and an e-mail address 312. The fields, of course, are merely exemplary as fewer or more fields may be used and different layouts of the fields may be used.

The system further may include the ability to customize the user interface. Similarly, the steps for entering various information described below may be performed in various different sequences and do not necessarily need to be entered in the sequence described with respect to the preferred embodiment.

The Configuration Administrator may, for example, begin with a preliminary step of entering a manufacturer and make of a particular card chassis 320 for which the interface is being configured. The Configuration Administrator similarly may enter a recommended receiver 322 and ITA 324 as preliminary steps.

At step 220, the Configuration Administrator begins by entering an instrument ID 330. Once the instrument ID 320 is entered, the system finds instrument data regarding the instrument corresponding to that ID. The instrument data may include compatibility data, pictures, or any other data that may be relevant. The data may be retrieved automatically from any of a variety of sources, such as a database stored locally on storage 114, from a manufacturer's website 130 or from both. For example, a database located on local storage 114 may include website information or links associated with particular manufacturers or particular part numbers such that when an instrument number is entered at step 220, the system (step 222) retrieves a link from the database and then proceeds to the linked website to retrieve specific data. In another embodiment, rather than retrieving a link or web address from the database, the system may automatically search for the manufacturer and/or part number through the internet and, once found, proceed to the manufacturer's website to retrieve the data. If the website is not found, data may be retrieved from a database and perhaps a note would be added to the instrument entry indicating that the data must be verified. To retrieve data from a manufacture's website, one may use, for example, Automated Test Markup Language ("ATML"). See "IEEE P1671/D2 Draft Trial-Use Standard for Automatic Test Markup Language (ATML) for Exchanging Automatic Test Equipment and Test Information via XML," (2005) and "ATML—The Standard for Interfacing Test System Components Using XML," National Instruments (2006).

At step 224, the Configuration Administrator enters a slot number 332 corresponding to the instrument ID entered at step 220. The method may include error-preventing techniques to prevent a user from entering incorrect or incompatible part numbers. At step 224, for example, the system may use data retrieved in step 222 for the particular instrument to ensure that the Configuration Administrator enters the correct number of slots for the particular instrument. The error-prevention techniques could include displaying a warning to a user that incorrect data may have been entered, may simply prohibit entry of incorrect data, or may initially prohibit such entry but permit a Configuration Administrator to override the protection. At any of the data retrieval steps, the local system 110 may store or update information regarding manufacturers, parts or websites in a database. In this manner, a local database of information may be compiled. Such a local database may be used, for example, in a situation in which a configuration is being made at a time when a manufacturer's website is unavailable. The system and method could further include means to tag entries pulled from a local database such that the system may access a manufacturer's database at a later time to confirm the accuracy of the data retrieved locally.

Next, at step 230 the Configuration Administrator enters a component ID 334. The system then retrieves data regarding the component associated with the component ID at step 232. As with step 222, the system may retrieve the component data in any of a variety of ways. The system then checks at step 234 whether the component entered at step 230 is compatible with the instrument entered at step 220. If the component is not compatible, the system may, for example, display an error message to the Configuration Administrator and request correction (step 236). The system may or may not provide the Configuration Administrator with the ability to override the error message and continue to step 240. This may be useful, for example, if the Configuration Administrator is aware the incorrect compatibility data exists for a particular component. If the entered component is compatible with the instrument entered at step 220, the system then associates the two locally as part of the interface system configuration.

The user then has a choice 250 of entering more components by returning to step 230 or proceeding to save the configuration in storage 114 at step 260. The user similarly may enter additional instruments and components for such additional instruments. When the configuration is saved, the system may for example assign a configuration number 340 to later identify this particular configuration. The configuration number 340 may be assigned automatically, such as with a random 7-digit number, or may be chosen by the user. Similarly, the date 350 on which the configuration was designed or modified may be entered automatically or manually.

Figure 4:
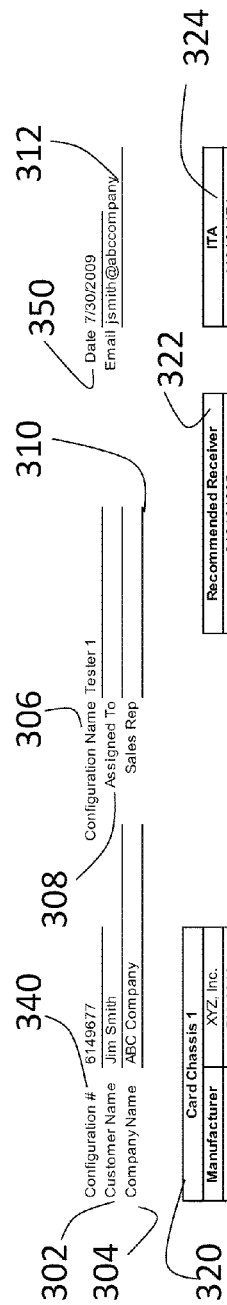
FIG. 4 is a diagram of an interface configuration preview in accordance with a preferred embodiment of the present invention.
Figure 5:
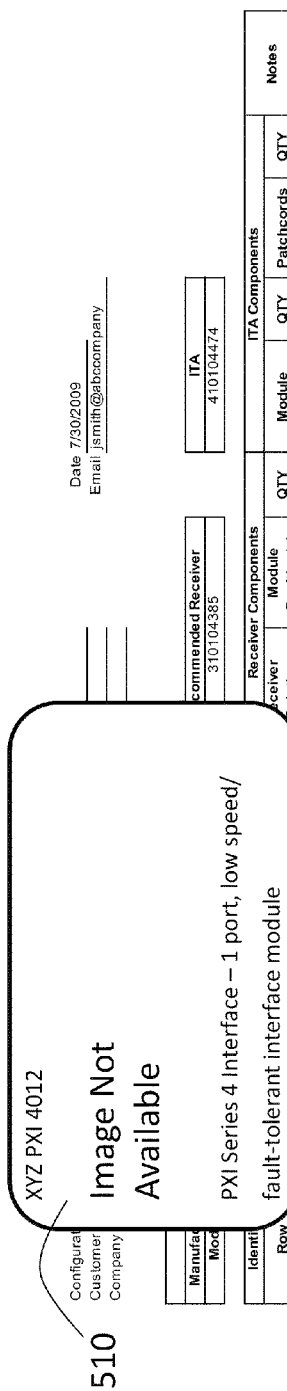
FIG. 5 is a diagram of an interface configuration preview with an instrument data link opened in accordance with a preferred embodiment of the present invention.
Figure 6:
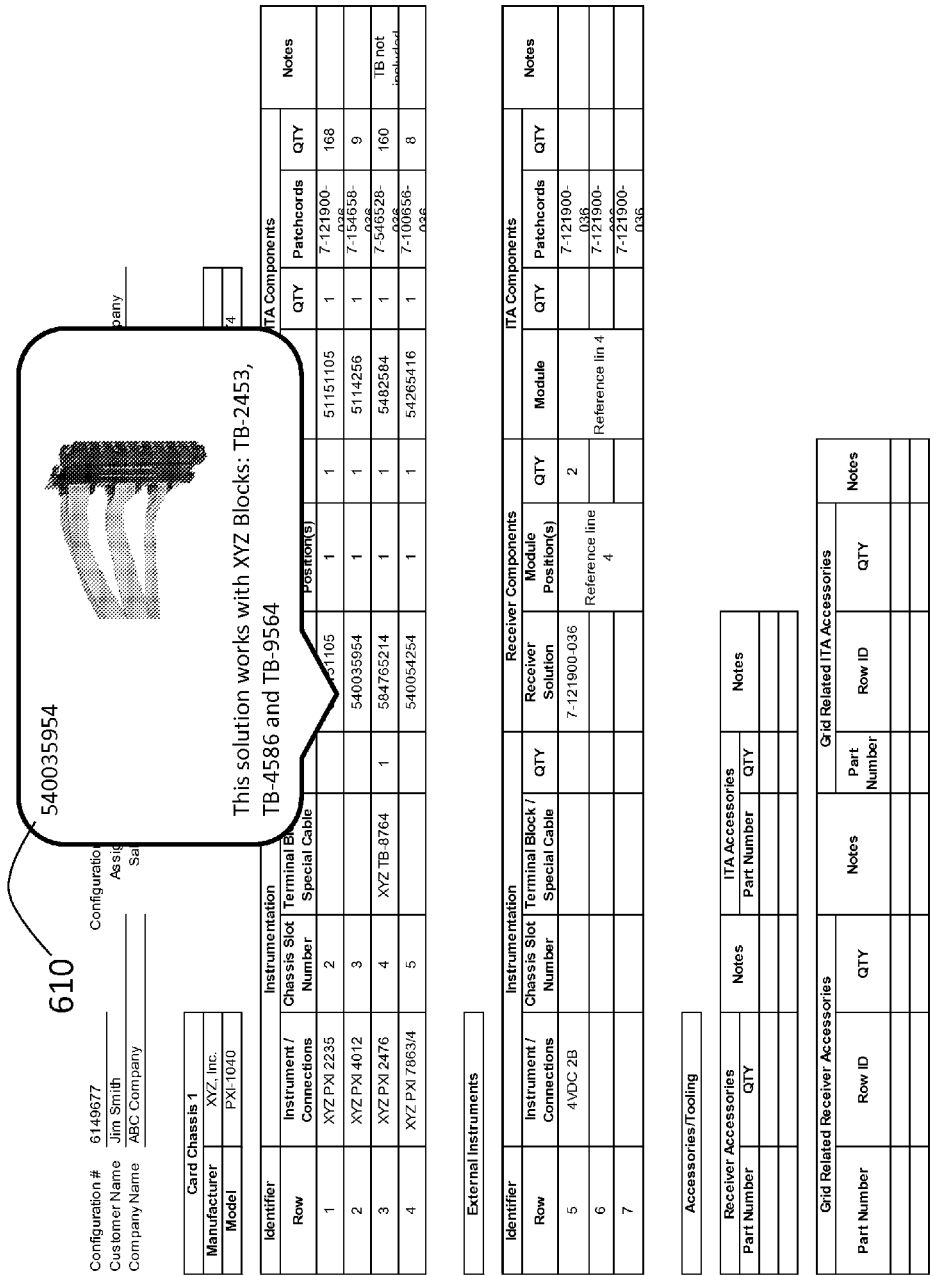
FIG. 6 is a diagram of an interface configuration preview with a receiver data link opened in accordance with a preferred embodiment of the present invention.

The Configuration Administrator then may preview the configuration or provide access to such a preview to a customer or manufacturer so they may review and possibly amend the configuration (step 270). If a preview is selected, at step 280 the system finds links to manufacturer's websites for as many of the instruments, components and cards as possible and at step 282 generates and displays a preview of the configuration, such as is shown in FIG. 4. The preview includes the links found by the system, which are displayed at step 286 at the selection of the user at step 284. For example, FIG. 5 shows a preview with an instrument data link 510. Similarly, FIG. 6 shows a preview with a receiver data link 610 opened. The data may be displayed in a call-out such as is shown in FIGS. 5 and 6 or by other means such as by opening a new window for the data or opening the manufacturer's website directly. If links are not found for particular instruments or components data from a database may or may not be displayed in place of data from a manufacturer's website.

After reviewing the data, the user may be given the option of amending the configuration (step 288), in which case the system would return to step 220. If the user does not wish to amend the system, the preview would be closed and ultimately, at step 290, the configurator would be closed.

Figure 7:
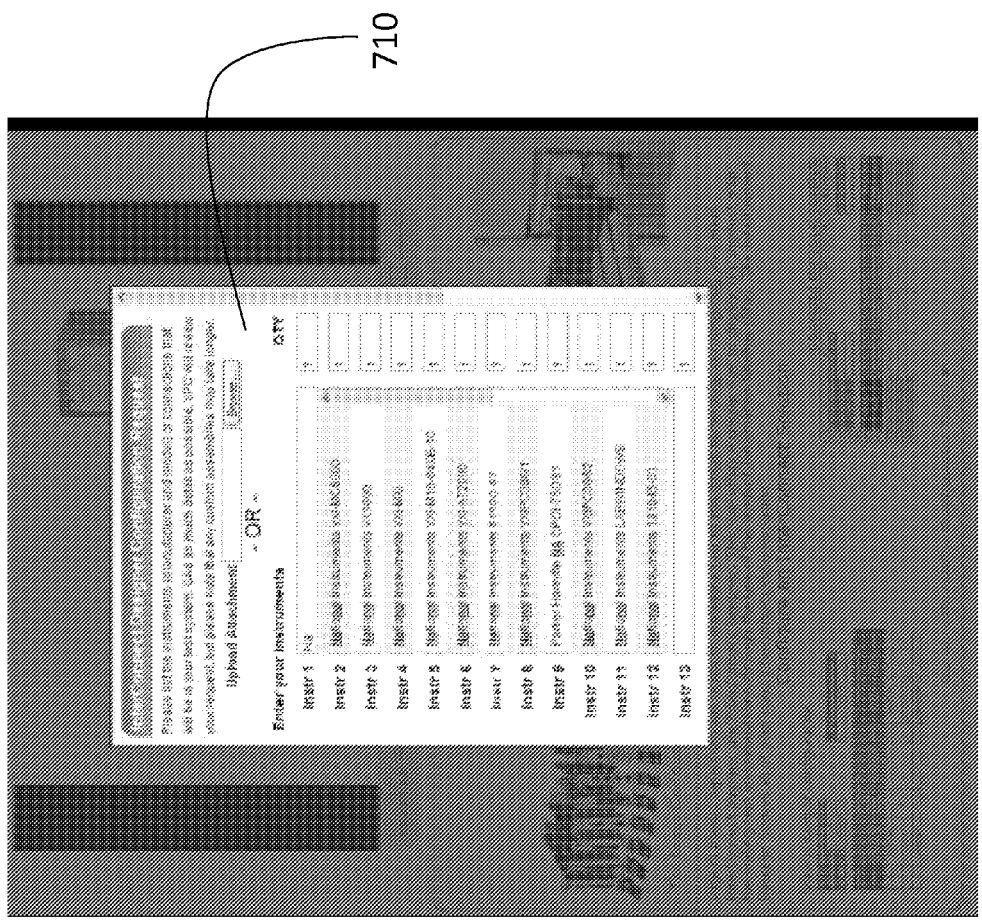
FIG. 7 is a diagram of a request form open in accordance with a preferred embodiment of the present invention.

The system and method further include the ability of a user to later access the configuration and if they so desire, amend the configuration. At such a time, the system may include automated methods to re-check or confirm the accuracy and compatibility of the data for various instruments and components in the configuration. The Configuration Administrator may receive a customer's request by any number of means. In one embodiment, a request form may be presented to a user via an electronic display. In FIG. 7, a request form 710 is shown superimposed over a configuration designer with the standard screen obscured. The request form 710 may include keyword hinting to assist the customer in selecting appropriate instrumentation. Default settings, such as a quantity of 1, may be used. A user's information may appear at the bottom of the request form and may be pre-populated based upon, for example, login data entered by a user. Once a user completes a request form, the user submits the request and a confirmation notice such as an electronic mail message or test message may be sent to the user by the system. The system may further include the ability to display a summary of various configurations submitted, for example, by a particular user or customer. Such summary may be presented in table form or may, for example, be produced on an Excel worksheet. Furthermore, information from a particular request may be downloaded into, for example, an Excel spreadsheet for display.

Figure 8:
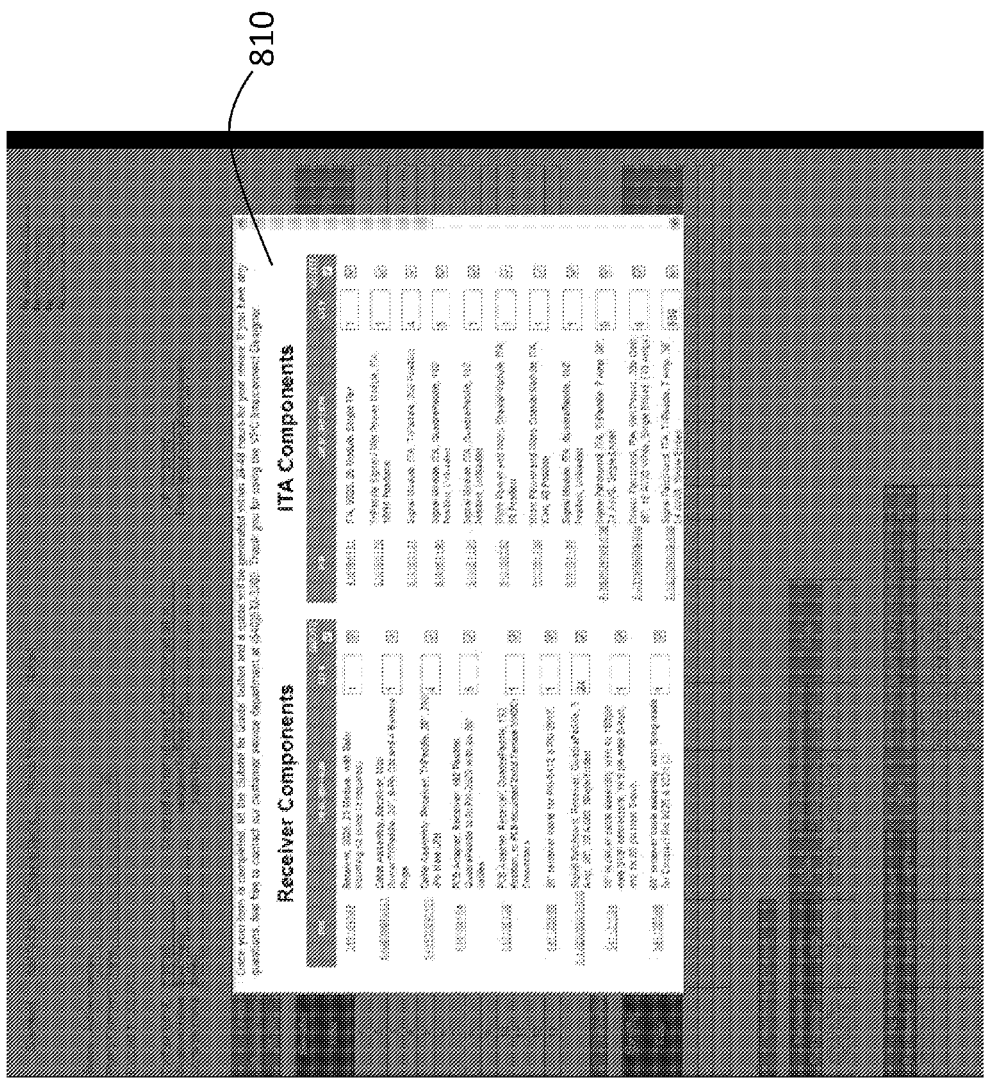
FIG. 8 is a diagram of a display provided to a Configuration Administrator during generation of a quotation in accordance with a preferred embodiment of the present invention.

Once a request is submitted, the local system may generate and display a quote for purchase of the configuration. The generation of the quotations may include steps in which a summary 810 or summaries of the various components in the configuration are displayed to the Configuration Administration, such as is shown in FIG. 8. During such a display step, the Configuration Administrator may select and deselect various items and modify quantities.

In other embodiments, various pieces of information may be entered automatically by the system. For example, if the system is being run by a particular receiver manufacturer, that manufacturer's receiver product information may be entered automatically by the system once the user enters an instrument identification or part number. Variations in which additional or other information is entered automatically by the system will be apparent to those of skill in the art.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A computer-implemented method for designing an electrical interconnect device, said method comprising the steps of:

entering an instrument ID into a computer through an input device;

entering a slot number corresponding to said instrument ID into said computer through said input device;

entering an interface component identifier into said computer through said input device;

determining whether data associated with said interface component identifier is available from a website of a manufacturer of an interface component identified by said interface component identifier;

if data associated with said interface component identifier is available from said website, determining whether an interface component identified by said interface component identifier is compatible with an instrument identified by said instrument ID using said data from said website;

if data associated with said interface component identifier is not available from said website, determining whether an interface component identified by said interface component identifier is compatible with an instrument identified by said instrument ID using said data retrieved from local storage;

if said interface component identified by said interface component identifier is not compatible with said instrument identified by said instrument ID, displaying an error message on a display;

if said interface component identified by said interface component identifier is compatible with said instrument identified by said instrument ID, associating said interface component identifier with said instrument ID and said slot number in a database, wherein said association comprises a result of said determination of whether an interface component identified by said interface component identifier is compatible with an instrument identified by said instrument ID; and generating and displaying on said display a preview of a configuration of an electrical interconnect device, wherein said preview comprises a table showing said instrument ID, said slot number, said interface component identifier and an association between said interface component ID and said instrument ID, and wherein said interface component ID shown in said preview comprises a link to data associated with said interface component.

2. A computer-implemented method for designing an electrical interconnect device in accordance with claim 1 further comprising the step of displaying in a separate window on said display said data associated with said interface component.

3. A computer-implemented method for designing an electrical interconnect device in accordance with claim 2, further comprising the step of storing said data retrieved from said website in a database on a local storage.

4. A computer-implemented method for designing an electrical interconnect device in accordance with claim 1 further comprising the step of electronically generating a price quotation for said configuration of an electrical interface device.

5. A computer-implemented method for designing an electrical interconnect device in accordance with claim 4 further comprising the step of displaying on said display said generated price quotation for said configuration of an electrical interface device.

6. A computer-implemented method for designing an electrical interconnect device in accordance with claim 4 further comprising the step of printing from said computer said generated price quotation for said configuration of an electrical interface device.

7. A computer-implemented method for designing an electrical interconnect device in accordance with claim 4 further comprising the step of generating an electronic mail message to a customer to provide said generated price quotation for said configuration of an electrical interface device to said customer.

8. A computer-implemented method for designing an electrical interconnect device in accordance with claim 1 wherein said step of displaying an error message on a display comprises a notice of incompatibility and a prompt to override said notice of incompatibility.

9. A computer-implemented method for designing an electrical interconnect device in accordance with claim 1, further comprising the step of tagging said data retrieved from said local database on said display as needing further confirmation.

10. A computer-implemented method for designing an electrical interconnect device, said method comprising the steps of:
    displaying on a display connected to a computer a request form requesting a plurality of instrument ID's from a user;
    providing a plurality of instrument ID's entered on said request form to a server;
    retrieving data associated with a first of said plurality of instrument ID's from a website of a manufacturer of an instrument associated with said first instrument ID;
    retrieving data associated with a second of said plurality of instrument ID's from a local storage connected to said server;
    determining whether a plurality of instruments identified by said plurality of instrument ID's are compatible with each other using said data associated with said first instrument ID and said data associated with said second instrument ID;
    generating on said server a configuration database corresponding to said plurality of instrument ID's entered on said request form, wherein said database comprises results of said determining whether a plurality of instruments identified by said plurality of instrument ID's are compatible with each other;
    associating a slot number with each of said plurality of instrument ID's in said configuration database;
    populating said configuration database in said server with a plurality of component identifiers;
    associating each of said plurality of component identifier with one of said instrument ID's and a slot number in said configuration database;
    generating and displaying on a display a preview of a configuration based upon data in said configuration database; and
    providing on said preview a link to data associated with a displayed instrument ID.

11. A computer-implemented method for designing an electrical interconnect device in accordance with claim 10, further comprising the step of displaying as an overlay on said preview said data associated with a displayed instrument ID.

12. A computer-implemented method for designing an electrical interconnect device in accordance with claim 10, further comprising the step of providing on said preview a link to data associated with a displayed component identifier.

13. A computer-implemented method for designing an electrical interconnect device in accordance with claim 10, further comprising the step of displaying as an overlay on said preview said data associated with said displayed component identifier.

* * * * *